(12) United States Patent
Katkar et al.

(10) Patent No.: US 10,192,181 B2
(45) Date of Patent: Jan. 29, 2019

(54) RESOURCE DEMAND-BASED PROJECT TEAM STAFFING

(71) Applicant: Oracle International Corporation, Redwood Shores, CA (US)

(72) Inventors: Vaibhav Maruti Katkar, Bangalore (IN); Vinay Jagannatha Rao, Bangalore (IN); Manish Kumar, Bangalore (IN); Raghavan Srinivasan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 856 days.

(21) Appl. No.: 14/315,576

(22) Filed: Jun. 26, 2014

(65) Prior Publication Data
US 2015/0379447 A1 Dec. 31, 2015

(51) Int. Cl.
*G06Q 10/06* (2012.01)
*G06F 3/0484* (2013.01)

(52) U.S. Cl.
CPC ........... *G06Q 10/06313* (2013.01); *G06Q 10/063118* (2013.01); *G06F 3/04845* (2013.01); *G06F 3/04847* (2013.01)

(58) Field of Classification Search
CPC .. G06Q 10/06; G06Q 10/06313; G06Q 10/10; G06Q 10/0631; G06Q 10/06311; G06Q 10/063112; G06Q 10/063118
(Continued)

(56) References Cited

U.S. PATENT DOCUMENTS 4,700,318 A   10/1987   Ockman
5,351,195 A    9/1994   Sherman
(Continued)

FOREIGN PATENT DOCUMENTS

EP   1306786 A3   1/2004
WO   2001029663 A1   4/2001
(Continued)

OTHER PUBLICATIONS

Jarnagan, Harry W., "Planning/Control of Professional Staff Resources," 2004 AACE International Transactions PM.01, 2004.*
(Continued)

*Primary Examiner* — Renae Feacher
(74) *Attorney, Agent, or Firm* — Potomac Law Group, PLLC

(57) ABSTRACT

A resource staffing manager is provided that manages resource staffing of project teams. A resource demand profile is provided including requirements for roles to be staffed for a project team and an allocated budget for staffing the project team. Based on the resource demand profile, the manager displays a project level graphical user interface that includes a pie chart and a donut chart. The pie chart includes a slice for each of the roles and the donut chart indicates the amount of the allocated budget remaining. Upon selection of a resource to be staffed to one of the roles, the manager updates the slice of the pie chart corresponding to the role to graphically indicate that the selected resource has been selected to be staffed to that role. Based on the selection of the resource, the manager updates the donut chart to indicate the amount of the allocated budget remaining.

16 Claims, 14 Drawing Sheets

(58) Field of Classification Search
USPC .................................................. 705/7.17
See application file for complete search history.

(56) References Cited

U.S. PATENT DOCUMENTS

| | | | |
|---|---|---|---|
| 5,408,663 A * | 4/1995 | Miller | G06Q 10/06 |
| | | | 718/104 |
| 6,023,702 A | 2/2000 | Leisten et al. | |
| 6,571,215 B1 | 5/2003 | Mahapatro | |
| 6,678,671 B1 | 1/2004 | Petrovic et al. | |
| 7,035,809 B2 | 4/2006 | Miller et al. | |
| 7,184,962 B2 | 2/2007 | Kalnas et al. | |
| 7,505,998 B2 | 3/2009 | Barrett | |
| 7,976,311 B2 | 7/2011 | Bantz et al. | |
| 8,306,841 B2 | 11/2012 | Clarke | |
| 8,311,865 B2 | 11/2012 | Vogel et al. | |
| 8,386,286 B2 | 2/2013 | Srinivas et al. | |
| 8,484,060 B2 | 7/2013 | D'Andrea et al. | |
| 8,510,230 B2 | 8/2013 | John et al. | |
| 8,517,742 B1 | 8/2013 | Johnson et al. | |
| 8,543,438 B1 | 9/2013 | Fleiss | |
| 8,560,364 B2 | 10/2013 | Vogel et al. | |
| 8,560,365 B2 | 10/2013 | Friedlander et al. | |
| 8,583,465 B1 | 11/2013 | Isamat et al. | |
| 8,595,044 B2 | 11/2013 | Bernardini et al. | |
| 2002/0193965 A1 * | 12/2002 | LaBlanc | G06Q 10/0635 |
| | | | 702/181 |
| 2003/0126141 A1 | 7/2003 | Hassman et al. | |
| 2003/0227458 A1 * | 12/2003 | Page | G06T 11/206 |
| | | | 345/440 |
| 2004/0002887 A1 | 1/2004 | Fliess et al. | |
| 2004/0017400 A1 | 1/2004 | Ly et al. | |
| 2004/0030992 A1 * | 2/2004 | Moisa | G06Q 10/10 |
| | | | 715/234 |
| 2005/0165930 A1 | 7/2005 | Whitman | |
| 2006/0004618 A1 | 1/2006 | Brixius | |
| 2006/0044307 A1 | 3/2006 | Song | |
| 2006/0177041 A1 | 8/2006 | Warner et al. | |
| 2006/0224259 A1 * | 10/2006 | Buil | G06F 17/3002 |
| | | | 700/94 |
| 2007/0005414 A1 | 1/2007 | Connors et al. | |
| 2007/0150327 A1 | 6/2007 | Dromgold | |
| 2008/0109740 A1 * | 5/2008 | Prinsen | G06F 3/0486 |
| | | | 715/764 |
| 2008/0172625 A1 | 7/2008 | Montgomery | |
| 2008/0192056 A1 * | 8/2008 | Robertson | G06T 11/206 |
| | | | 345/440 |
| 2008/0195452 A1 | 8/2008 | Leon | |
| 2009/0070363 A1 * | 3/2009 | Bull | G11B 27/105 |
| 2009/0076878 A1 | 3/2009 | Woerner et al. | |
| 2009/0199113 A1 | 8/2009 | McWhinnie et al. | |
| 2009/0222310 A1 * | 9/2009 | Vollmer | G06Q 10/06313 |
| | | | 705/7.23 |
| 2009/0234699 A1 | 9/2009 | Steinglass et al. | |
| 2010/0138268 A1 | 6/2010 | Guo et al. | |
| 2010/0162152 A1 * | 6/2010 | Allyn | G06F 3/0481 |
| | | | 715/767 |
| 2010/0305994 A1 | 12/2010 | Gaskell | |
| 2011/0007075 A1 * | 1/2011 | Lee | G06F 3/0482 |
| | | | 345/440 |
| 2011/0115795 A1 * | 5/2011 | Koch | G06T 11/20 |
| | | | 345/440 |
| 2011/0125539 A1 | 5/2011 | Bollapragada et al. | |
| 2011/0153379 A1 | 6/2011 | Toba et al. | |
| 2011/0208557 A1 | 8/2011 | Gonzalez Diaz et al. | |
| 2012/0109794 A1 * | 5/2012 | Nathanson | G06Q 10/10 |
| | | | 705/32 |
| 2012/0116835 A1 | 5/2012 | Pope et al. | |
| 2012/0130907 A1 | 5/2012 | Thompson et al. | |
| 2012/0215578 A1 | 8/2012 | Swierz, III et al. | |
| 2012/0306887 A1 | 12/2012 | Mohammad et al. | |
| 2013/0159197 A1 | 6/2013 | Singh et al. | |
| 2013/0187926 A1 * | 7/2013 | Silverstein | G06Q 10/105 |
| | | | 345/440 |
| 2013/0246110 A1 | 9/2013 | Nakhayi Ashtiani et al. | |
| 2016/0027193 A1 * | 1/2016 | Schiffer | G06F 17/24 |
| | | | 345/440 |

FOREIGN PATENT DOCUMENTS

| | | | |
|---|---|---|---|
| WO | 2002082335 A2 | 10/2002 | |
| WO | 2008105772 A1 | 9/2008 | |

OTHER PUBLICATIONS

Absenteeism and Staff Retention, http://www.hrinz.org.nz/Site/Resources/Knowledge_Base/A-H/Absentism.aspx, last downloaded Feb. 12, 2014, p. 1-3.

Activ Absence Control, http://assets-production.govstore.service.gov.uk/Gii%20Attachments/06b%20Cats%20-%20uploaded/G2.176%20-%20METHODS%20CONSULTING%20LTD/Archive1/B2%20ActiV%20Absence%20Control%20Brochure%201210.pdf, last downloaded Jun. 2, 2014, p. 1-8.

Dr. Ahmed Sameh et al., "SE 503 Advanced Project Management", http://www.google.co.in/url?sa=t&rct=j&q=&esrc=s&source=web&cd=16&ved=0CEwQFjAFOAo&url=http%3A%2F%2Finfo.psu.edu.sa%2Fpsu%2Fcis%2Fasameh%2FSE503%2FC-Chain3.PPT&ei=1rcFU5v9AcfprQfBnoHYDw&usg=AFQjCNH2FF1dCMrnt2Q6wWFcsf42NATIkA&bvm=bv.61725948,d.bmk&cad=rja, last downloaded Jun. 2, 2014, p. 1-22.

Assigning Resources to Tasks, http://publib.boulder.ibm.com/infocenter/ratportm/v7r1m1/index.jsp?topic=/com.ibm.help.doc/assigning_resources.html, last downloaded Jun. 2, 2014, p. 1-5.

CA Clarity PPM, Functional Overview of the CA Clarity Project and Portfolio Management System, http://www.ca-clarity.com/cms/upload/En/pdf/CA_Clarity_Functional_Overview.pdf, last downloaded Jun. 2, 2014, 40 pages.

Calculating Absenteeism, Retention & Turnover, https://www.gnb.ca/0012/Womens-Issues/wg-es/tools/pdf/hr_calc-e.pdf, last downloaded Jun. 2, 2014, p. 1-3.

Controlling the Uncontrollable-How Return-to-Work Programs Reduce Costs and Boost Productivity, http://research.prudential.com/documents/rp/127974_RTW_WP_r2.pdf, last downloaded Jun. 2, 2014, 11 pages.

Eric Uyttewall, "Dynamic Scheduling with Microsoft Project 2002", J. Ross Pub; 1 edition (Apr. 2003), p. 435.

Employee Scheduling & Human Resource Planning, http://www.mjc2.com/employee-scheduling-software.htm, last downloaded Jun. 2, 2014, p. 1-3.

ERP Software 360, "Assembling the Right Project Team", http://www.erpsoftware360.com/project-team.htm, last downloaded Jun. 2, 2014, p. 1-4.

Gantt Project, http://sourceforge.net/p/ganttproject/feature-requests/383/, last downloaded Jun. 2, 2014, p. 1-2.

GanttPV, http://www.pureviolet.net/ganttpv/, last downloaded Jun. 2, 2014, p. 1-3.

Software Selection Whitepapers, "Software Selection Getting Started Project Teams", http://www.software4distributors.com/media/whitepapers/BSWC_Software_Selection_Project_Teams.pdf, last downloaded Jun. 2, 2014, p. 1-13.

Bevan et al., "How Employers Manage Absence", Institute for Employment Studies—IES, Mar. 2004, http://www.employment-studies.co.uk/pubs/surnmary.php?id=err25, last downloaded Jun. 2, 2014, p. 1-6.

Harvey Levine, "How to Allocate Resources and Build Optimal Teams", http://www.attask.com/wp-content/uploads/2011/07/Art-How-to-Allocate-Resources-and-Build-Optimal-Teams.pdf, last downloaded Jun. 2, 2014, p. 1-5.

IBM Rational Portfolio Manager, "Project Staffing", http://publib.boulder.ibm.com/infocenter/ratportm/v7r1m1/index.jsp?topic=/com.ibm.help.doc/project_staffing.html, last downloaded Jun. 2, 2014, p. 1-3.

NetSuite Open Air, "Resource Management", http://www.openair.com/Resource-Management, last downloaded Jun. 2, 2014, p. 1.

(56) References Cited

OTHER PUBLICATIONS

Planning planet, "Network Diagram/Logic Diagram Cluttered and Unreadable," http://www.planningplanet.com/forums/planning-scheduling-programming-discussion/535990/network-diagram-logic-diagram-cluttered-and, last downloaded Jun. 2, 2014, p. 1-8.
The Omni Group, "OmniPlan Manual", Version 1.0, (2000-2009), p. 1-84.
Oracle Common Application Calendar User Guide, "Oracle Assignment Manager", Release 12.1, Part No. E13407-04, http://docs.oracle.com/cd/E18727_01/doc.121/e13407/T87077T87097.htm, last downloaded Jun. 2, 2014, p. 1-16.
Oracle Data Sheet, "Oracle's Primavera P6 Enterprise Project Portfolio Management", (2013) p. 1-4.
Oracle Projects Fundamentals, "Project Team Definition", Release 12.1, Part No. E13581-04, http://docs.oracle.com/cd/E18727_01/doc.121/e13581/T181945T284438.htm, last downloaded Jun. 2, 2014, p. 1-17.
Kronos, White Paper, "Out Sick: How to Minimize the Impact of Unplanned Absences in the Energy Industry", Reduce Costs and Increase Productivity with an Automated Absence Management Solution, http://www.kronos.com/ads/field/49/Kronos_field_ad.pdf, last downloaded Jun. 2, 2014, p. 1-8.
Assessments.biz, "Profiles Team Analysis Corporate Team Building Tools", http://assessments.biz/corporate-team-building.asp, last downloaded Jun. 2, 2014, p. 1-2.
Project insight, "Resource Allocation in Project Management Software", http://www.projectinsight.net/project-management-softwaregeatures/resource-allocation-in-project-management-software.aspx, last downloaded Jun. 2, 2014, p. 1.
daptiv, "Project Management Office (PMO) Software", http://www.daptiv.com/solutions/daptiv-for-the-pmo.htm, last downloaded Jun. 2, 2014, p. 1-4.
Anonymous as per GECCO double blind submission rules, "Search-based techniques for optimizing software project resource allocation", http://www0.cs.ucl.ac.uk/staff/ni.harman/icsm05b.pdf, Jan. 19, 2004, p. 1-11.
TeamSeer, "Smart absence and holiday management software that really saves you time", http://media.teamseer.com/downloads/TeamSeer_brochure.1.pdf, last downloaded Jun. 2, 2014, p. 1-9.
TeamGantt, "View Resource Availability Inside your Gantt Charts!", http://teamgantt.com/blog/2012/10/16/view-resource-availability-inside-your-gantt-charts/, last downloaded Jun. 2, 2014, p. 1-3.
Microsoft Office Team Planner, "View your team's work with Team Planner", http://office.microsoft.com/en-in/project-help/view-your-team-s-work-with-team-planner-HA010373239.aspx, last downloaded Jun. 2, 2014, p. 1-3.
Tenrox by upland, Project Workforce Management Software—PWM Software, "Resource Management Module", Manage Resources and Schedules across the Entire Organization—and Beyond, http://www.tenrox.com/en/solutions/project-worforce-management-resource-management-module.htm, last downloaded Jun. 2, 2014, p. 1-7.
Wang, et al., "Three-dimensional gantt chart based resource-constrained multiple projects scheduling and critical chain identification", 2011 IEEE 18th International Conference on Industrial Engineering and Engineering Management (IE&EM) vol. Part 3, No., pp. 1597,1601, Sep. 3-5, 2011.
Wikipedia, "Gantt chart", http://en.wikipedia.org/wiki/Gantt_chart, last visited May 1, 2014, p. 1-3.
Vaibhav Aparimit et al., U.S. Appl. No. 14/293,373, filed Jun. 2, 2014.
Vaibhav Aparimit et al., U.S. Appl. No. 14/302,483, filed Jun. 12, 2014.
Available views, http://office.microsoft.com/en-usiproject-help/available-views-HP010210179.aspx, last downloaded Nov. 18, 2014, p. 1.
Niladri De et al., U.S. Appl. No. 13/776,747, filed Feb. 26, 2013.

* cited by examiner

200

| Role Name | Skills | No of Resources | Duration (hours) |
|---|---|---|---|
| Dev | Java | 3 | 30 |
| BA | Project Mgmt | 1 | 30 |
| QA | Selenium | 2 | 30 |
| Total | | 6 | 90 |

Fig.2

| Resource Name | Cost($) | Duration (hours) | Availibility(%) |
|---|---|---|---|
| Tom | 70 | 10 | 100 |
| Oscar | 80 | 10 | 50 |
| Varun | 150 | 15 | 100 |
| Bob | 75 | 10 | 100 |

| Role Name | Skills | No of Resources | Average resource cost($) | Total Avg Resource Cost($) |
|---|---|---|---|---|
| Developer | Java | 3 | 81.25 | 243.75 |
| BA | Project Mgmt | 1 | 85 | 85 |
| QA | Selenium | 2 | 80 | 160 |
| Total | | 6 | | 488.75 |

| Resource Name | Duration (Hours) | Cost($) |
|---|---|---|
| Tom | 10 | 70 |
| Oscar | 5 | 40 |
| Varun | 5 | 50 |
| Bob | 10 | 75 |
| Total | 30 | 235 |

Fig.6

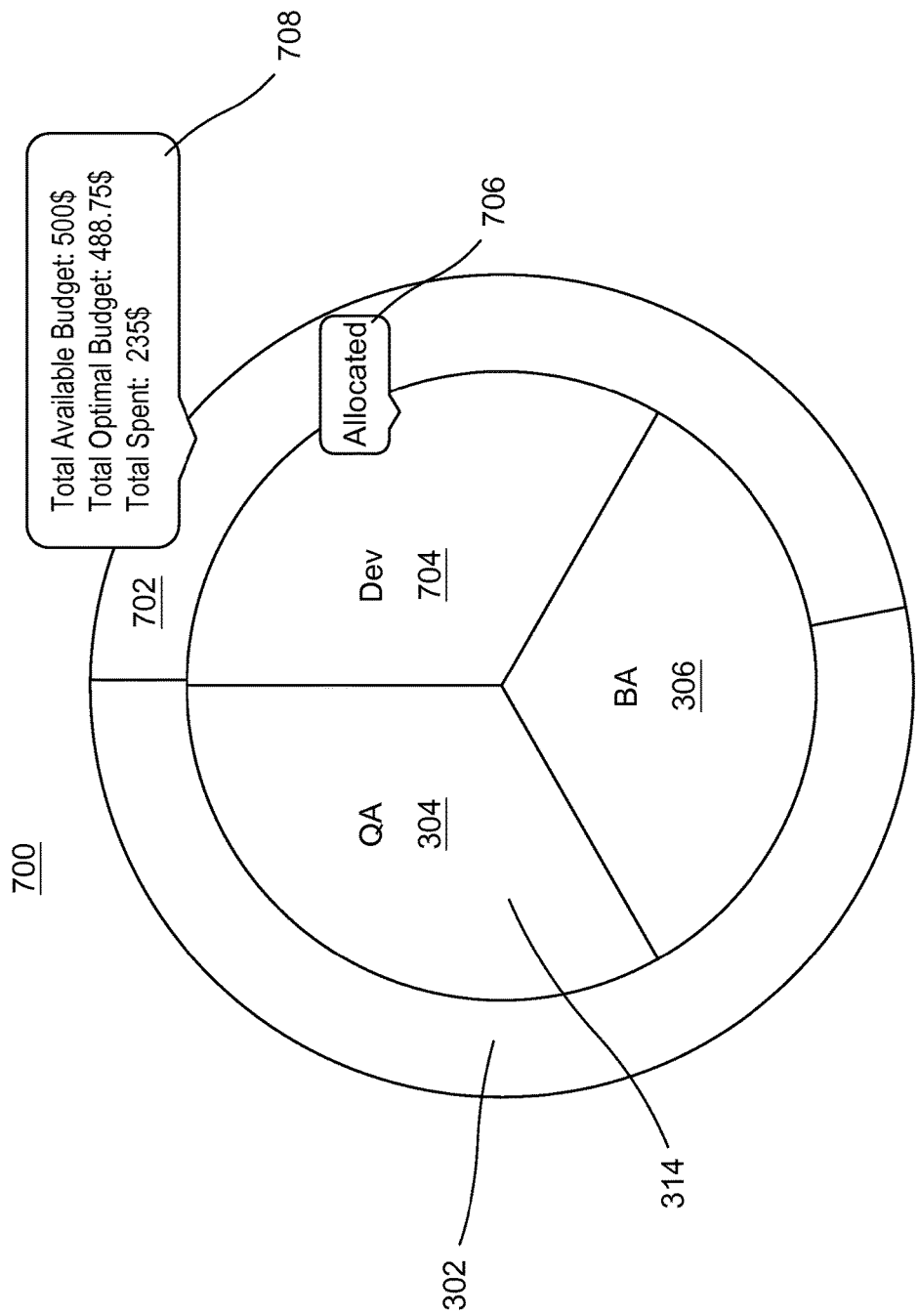

RESOURCE DEMAND-BASED PROJECT TEAM STAFFING

FIELD

One embodiment is directed generally to a computer system, and in particular to a computer system that displays a graphical user interface for project team staffing according to a resource demand profile.

BACKGROUND INFORMATION

A responsibility of a project manager is to forecast the resource demand profile that will be required by a project before the work begins. The resource demand profile can be defined as the roles, skills and number of resources that will be necessary to complete the work on a project. The project manager may work in conjunction with other members of the Project Management Office ("PMO"), the planner/scheduler, and/or field personnel to create this resource demand profile at the project level, and then work together with resource managers and procurement managers to fulfill the resource needs of the project in a timely fashion.

The staffing can be done by running a manual search on each of the requirements. The search then generates a list of resources to choose from based on their availability. Then, the project/resource manager could choose from the list of resources and could choose to staff the corresponding role requirement.

Resource finding is one of the key areas in staffing the resource demand profile requirements of a project, and manually searching for role staffing as described above may be time consuming, inefficient, and/or costly.

SUMMARY

One embodiment is a system that manages resource staffing. The system provides a resource demand profile including requirements for roles to be staffed for a project team and an allocated budget for staffing the project team. Based on the resource demand profile, the system displays a project level graphical user interface that includes a pie chart and a donut chart. The pie chart includes a slice for each of the roles and the donut chart indicates the amount of the allocated budget remaining. Upon selection of a resource to be staffed to one of the roles, the system updates the slice of the pie chart corresponding to the role to graphically indicate that the selected resource has been selected to be staffed to that role. Based on the selection of the resource, the system updates the donut chart to indicate the amount of the allocated budget remaining.

BRIEF DESCRIPTION OF THE DRAWINGS

FIG. 2 illustrates a resource demand profile defining staffing requirements of a project, in accordance with one embodiment.

FIG. 4 is a table illustrating resources available for the Dev role, in accordance with one embodiment.

FIG. 5 is a table illustrating role requirements and calculated role attributes, in accordance with one embodiment.

FIG. 6 is a table illustrating a Best Solution Staffing result, in accordance with one embodiment.

FIG. 7 illustrates a graphical user interface for project level resource staffing indicating the complete staffing of the Dev role, in accordance with one embodiment.

DETAILED DESCRIPTION

One embodiment is a system that provides a graphical user interface for dynamically searching resources to staff a project team and optimizes resource finding for the project team. The system can enable a user (e.g., a project/resource manager) to find desired resources for project execution based on the allocated budget for a project and/or other project variables that are defined in a resource demand profile. The system can provide dynamic resource searching/finding that considers both budget limitations and schedule limitations at both the role level and the project level.

Figure 1:
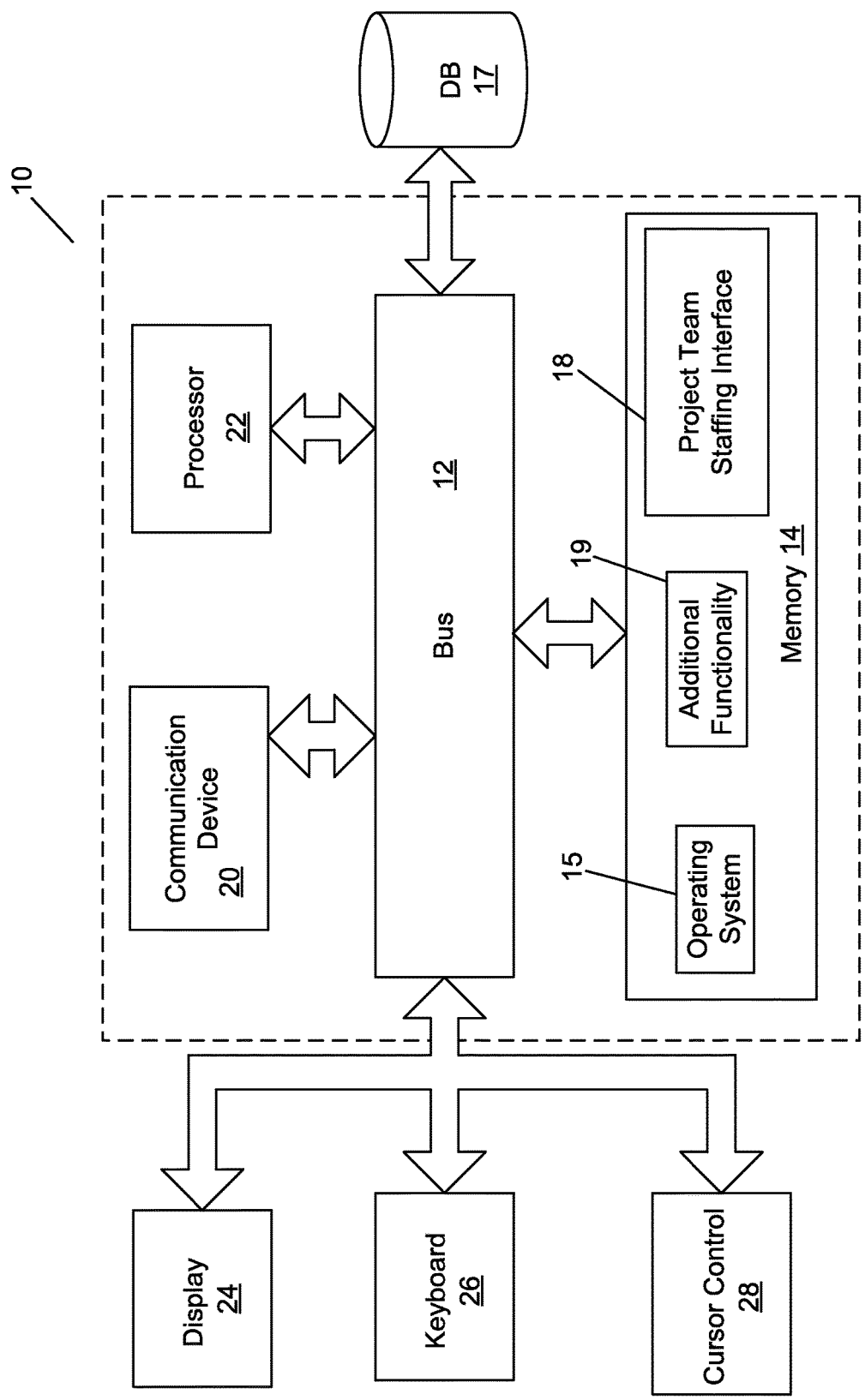
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a project team staffing interface (or "project staffing interface") 18 that generates suggested project teams and/or provides a graphical user interface for staffing a project team, as disclosed in more detail below. System 10 can be part of a larger system, such as an enterprise resource planning ("ERP") system. Therefore, system 10 will typically include one or more additional functional modules 19 to include the additional functionality. A database 17 is coupled to bus 12 to provide centralized storage for modules 18 and 19 and store project management information, resource information, etc.

In one embodiment, system 10 assists a user (e.g., a project/resource manager) in choosing resources for staffing a project team by allowing the user to choose a best team solution at least cost, as suggested by the system, and/or allowing the user to manually select the resources the user wishes to choose. In such embodiments, system can 10 can provide a graphical approach that includes providing a graphical user interface that gives better insight of the requirements (e.g. the resource demand profile) and how those requirements are being met during resource selection and staffing of the project team.

In some embodiments, the best team solution is suggested by system 10 by running a regression analysis on a combination of, for example: cost for each resource, number of resources required, and duration for which the role has to be staffed. In such embodiments, regression analysis can generate a list of all possible solutions which could be used to staff the role, and then the best solution which would cost the least is suggested to the user (e.g., the project/resource manager).

In some embodiments, the graphical approach is provided by system 10 and assists the user (e.g., the project/resource manager) to select desired resources by providing, for example, the following attributes as references: total available budget (representing the total budget allocated to the project); and optimal cost per role (equal to the average cost of available resources per role). In some embodiments, as a role becomes partially staffed, system 10 recalculates the average cost and calculates a new value of optimal cost per role based on the recalculated average cost. In such embodiments, system 10 can display the recalculated values to the user (e.g., the project/resource manager) in a graphical and/or textual manner, as described below. The total available budget can also be recalculated accordingly. The recalculations can be performed and/or displayed to enable the user (e.g., project/resource manager) to make a proactive and informed decision.

FIG. 2 illustrates a resource demand profile 200 defining staffing requirements of a project, in accordance with one embodiment. Resource demand profile 200 includes a requirement to staff three roles (developer (or "Dev"), business analyst (or "BA"), and quality assurance analyst (or "QA")) with respective skill sets, a number of resources, and a duration for which the role is to be staffed to execute the project. For example, to staff the Dev role, three developers with skill set including "Java" are desired for a total duration of 30 hours (e.g., resource demand profile 200 specifies that a minimum of three resources cumulatively for 30 hours are desired for this role). Duration for a role can be the total man hours required, which can be computed based on a start and finish date and standard work calendar. Resource demand profile 200 can also include a total allocated budget (not shown) that can be used to staff the resource. For the examples described herein, the total allocated budget for resource demand profile 200 is $500.

Figure 3:
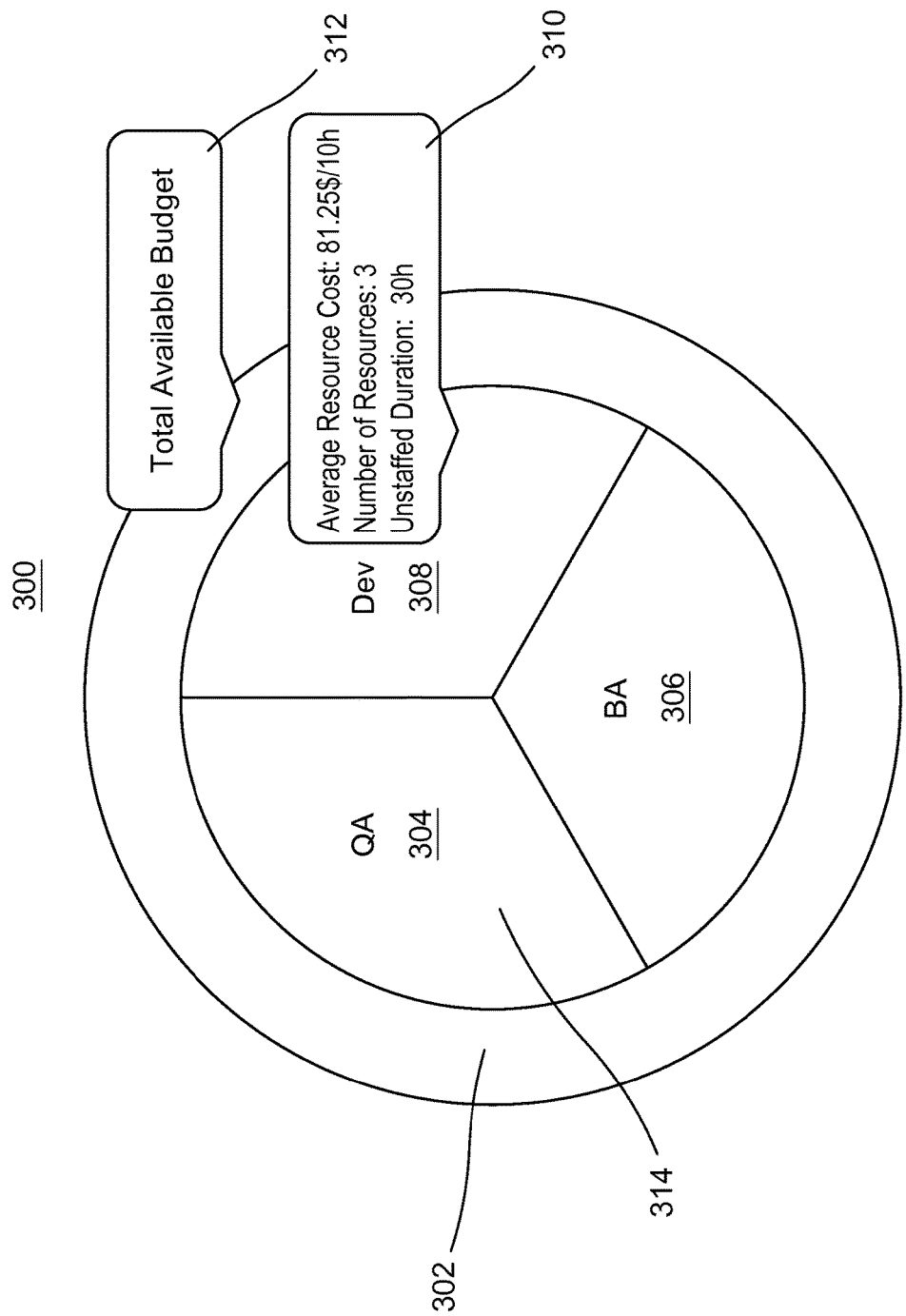
FIG. 3 illustrates a graphical user interface for project level resource staffing based on a resource demand profile, in accordance with one embodiment.

FIG. 3 illustrates a graphical user interface 300 for project level resource staffing based on resource demand profile 200, in accordance with one embodiment. Graphical user interface 300 can include a donut chart 302 and a pie chart 314. Pie chart 314 can include a quality assurance (or QA) role pie slice 304, development (or Dev) role pie slice 308, and a business analyst (or BA) role pie slice 306. As resources are staffed to roles, each role's slice of pie chart 314 (e.g., 304, 306, and 308) can be shaded to indicate the portion of that role that has been staffed, as shown below in FIG. 10A. As resources are selected for staffing to the roles, donut chart 302 can be updated to indicate the portion of the budget used by the currently selected/staffed resources and the portion of the budget still remaining, as shown below in FIG. 10A.

Graphical user interface 300 can be shown to a user (e.g., a resource/project manager) at the project level for staffing a project demand profile, such as project demand profile 200 shown in FIG. 2 above. For example, graphical user interface 300 displays the total available budget to staff the resource demand (e.g., $500) which is depicted by donut graph 302. Pie chart 314 can be divided based on the duration requirement for each particular role. Each of the roles in resource demand profile 200 is required for a duration of 30 hours, hence slices 304, 306, and 308 are equally divided in pie chart 314. In some embodiments, pie chart 314 can be divided based on different requirements of the roles or a combination or requirements of the roles (as discussed above, the requirements can be specified by the resource demand profile).

In some embodiments, upon a user hovering or otherwise selecting (e.g., pointing over) the pie slice of a role, metadata 310 containing role level attributes such as, for example, "Average Resource Cost," "Number of Resources," and "Duration" can be presented to the user (e.g., project/resource manager) in the form of, for example, a callout. The attributes Number of Resources and Duration can be obtained from the resource demand profile. The attribute Average Resource Cost can be calculated as discussed below in FIG. 5.

Upon user selection of a particular role to staff (e.g., upon a user clicking on or otherwise selecting QA pie slice 304, BA pie slice 306, or Dev pie slice 308) the user (e.g., the project/resource manager) is provided following options for staffing the selected role:

Best Solution Staffing (or "best solution approach"); and
Graphical Staffing (or "graphical approach").

FIG. 4 is a table 400 illustrating resources available for the Dev role, in accordance with one embodiment. Table 400 can include a list of available resources for the Dev role and, for each available resource, attributes such as: resource name, cost, duration and availability. For example, the cost of resource "Tom" is $70 for a duration of 10 hours, with Tom's availability being 100% for the corresponding requirement. Once a resource demand profile is created, a user (e.g., project/resource manager) can run a search for resources to staff a project team based on the requirements of the resource demand profile.

In some embodiments, if the user (e.g., project/resource manager) chooses the graphical approach option for staffing a selected role, or if the user chooses the best solution approach option but decides to staff the role without using the best solution suggested by the system, the list of available resources included in table 400 can be graphically presented to the user for graphical selection, as shown, for example, in FIGS. 8A, 8B, 9A, and 9B below. In some embodiments, the project/resource manager can select a role to staff by selecting the corresponding pie slice (e.g., 304, 306, or 308). For example, the project/resource manager can begin to staff the Dev role by selecting the Dev pie slice 308 of pie chart 314. The available resources for the Dev role shown in table 400 can be graphically presented to the project/resource manager for manual graphical selection (as shown, for example, in FIGS. 8A, 8B, 9A, and 9B below), if the project/resource manager chooses to staff the role without using the best solution suggested by the system.

FIG. 5 is a table 500 illustrating role requirements and calculated role attributes, in accordance with one embodiment. The role requirements can include the list of roles and corresponding skills and number of resources from resource demand profile 200 and the calculated role attributes can include "Average Resource Cost" and "Total Average Resource Cost." Average Resource Cost can be calculated for a particular duration. For example, for the Dev role shown in FIG. 2, the Average Resource Cost is calculated for 10 hours as follows:

Average Resource Cost=(70+80+100+75)/4=$81.25 for 10 hours;
Where 70, 80, 100 and 75 are the respective costs for the resources Tom, Oscar, Varun and Bob for a duration of 10 hours each (the cost of resource Varun from FIG. 2 is $150 for 15 hours and hence $100 for 10 hours).
Total Average Resource Cost can be calculated as follows:
Total Average Resource Cost=Average Resource Cost× Number of Resources;
Total Average Resource Cost for each role is the optimal cost per role.

FIG. 6 is a table 600 illustrating a Best Solution Staffing result, in accordance with one embodiment. If the user chooses to staff a role utilizing the Best Solution Staffing option, then the user is presented with a table which shows the best way to choose resources to staff the role with minimal budget usage. FIG. 6 shows the best solution for staffing the Dev role described in resource demand profile 200 shown in FIG. 2 above. The best solution can be calculated by running a regression analysis to compute all possible solutions and further choosing the best possible solution. If the user decides to go with the best solution then the respective role will be staffed according to the calculated solution (e.g., the solution for staffing the Dev role described above according to Best Solution Staffing is shown in FIG. 6).

In some embodiments, the best solution approach suggests a resource team for a role requirement which would cost the least, without considering the number of the resources mentioned in the resource demand profile. In some embodiments, the duration requirement is considered. The user (e.g., the project/resource manager) may reconsider the number of resources required by the resource demand profile based on the result of the best solution approach. For example, resource demand profile 200 shown in FIG. 2 required three resources for the Dev role; however, from regression analysis, the system suggests that the best solution shown in FIG. 6 uses four resources which would cost the least and still get the work done. For example, the system can calculate the cost of each combination of resources and select the combination with the lowest cost as the best solution. In some embodiments, if multiple combinations have the same lowest cost, all the combinations can be provided to the user and the user can choose the desired combination.

FIG. 7 illustrates a graphical user interface 700 for project level resource staffing indicating the complete staffing of the Dev role, in accordance with one embodiment. When a user completely staffs a role by, for example, selecting the option of staffing the Dev role (308) using the best solution approach, graphical user interface 300 can be updated to reflect the complete staffing of the role as shown in graphical user interface 700. In graphical user interface 700, the color of Dev portion 308 of pie chart 314 shown in FIG. 3 can be changed to a different color, as shown by Dev role pie slice 704, to indicate that the Dev role has been completed staffed. Message 706 can also be included to indicate that the Dev role has been completed staffed. In addition, donut chart 302 of FIG. 3 can be updated to include a portion 702 representing the portion of the budget that has been allocated according to the selected staffing of the Dev role. Message 708 can also be included to provide text indicating, for example, the total available budget, the total optimal budget, and the total allocated.

In some embodiments, if the user (e.g., project/resource manager) selects the Graphical Staffing option or selects the Best Solution Staffing option but does not wish to select the best solution suggested, the project/resource manager can be presented with one or more interfaces for graphically staffing the selected role (e.g., 304, 306, or 308), such as those interfaces shown below in FIGS. 8A, 8B, 9A, and 9B.

Figure 8A:
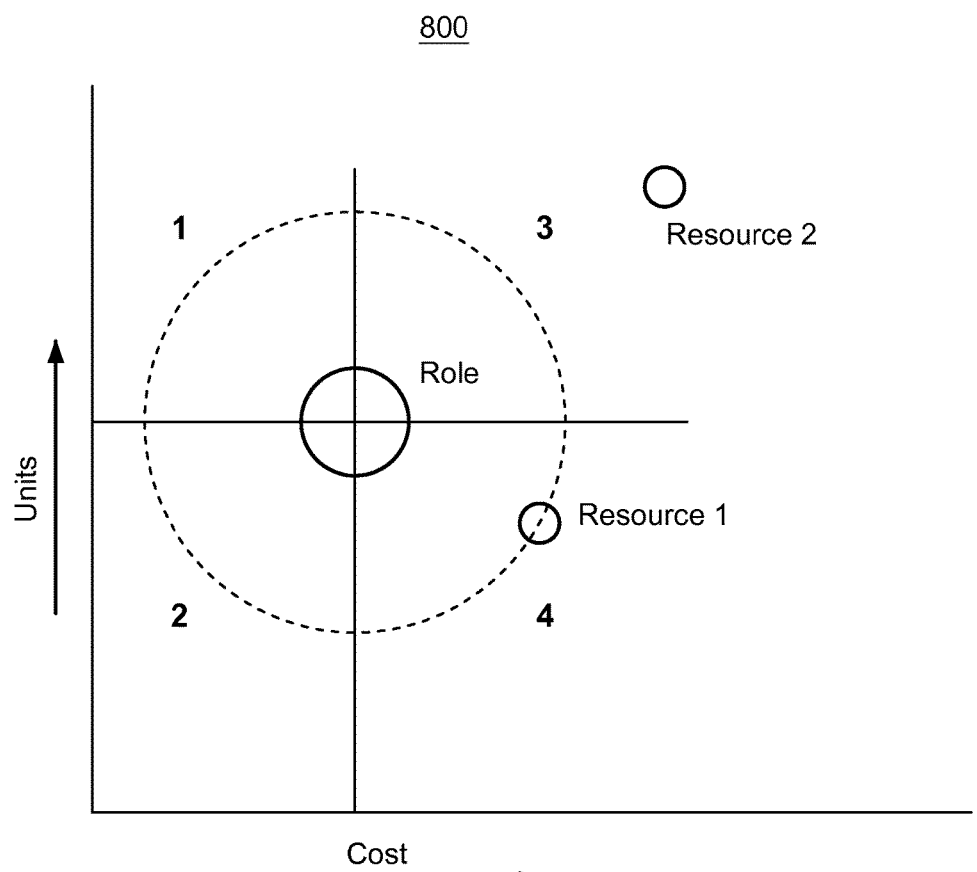
FIG. 8A illustrates a graphical user interface for priority based resource selection, in accordance with one embodiment.

FIG. 8A illustrates a graphical user interface 800 for priority based resource selection, in accordance with one embodiment. Graphical user interface 800 can include a graph with quadrants 1-4, a role, a resource 1, and a resource 2. The priority of quadrants 1-4 can be ranked to assist the user (e.g., project/resource manager) in selecting resources. The role can be graphed using the Average Resource Cost and the average duration needed for the number of resources required (or desired) for the role. Quadrants 1-4 can be displayed based on the location of the role in the graph, as shown in FIG. 8A, and the quadrants can be used as an indicator for selecting resources.

For example, quadrant 1 indicates the quadrant which is most likely preferred, as a resource under this quadrant is available at a lower cost than average role cost and more man hours compared to quadrant 2. Quadrant 4 indicates the quadrant which is the least preferred as the resources under this quadrant are available at a higher cost than average role cost and less man hours compared to quadrant 3. Quadrant 2 may be preferred over quadrant 3, as resources under quadrant 2 are less costly than those under quadrant 3. However, quadrant 3 may be more preferred over quadrant 2 because resources under quadrant 3 have more man hours than those under quadrant 2.

In some embodiments, the distance of a resource from the role to be staffed can also be provided and considered as another parameter during resource selection, as shown in FIG. 8A. For example, as indicated by the dotted circle running through resource 1, resource 1 is closer to the role than resource 2. In some embodiments, the dotted circle can be drawn by the system through the resource closest to the role. Additional or alternatively, in some embodiments, the dotted circle can be drawn by the system through any resource upon user selection of the resource.

Figure 8B:
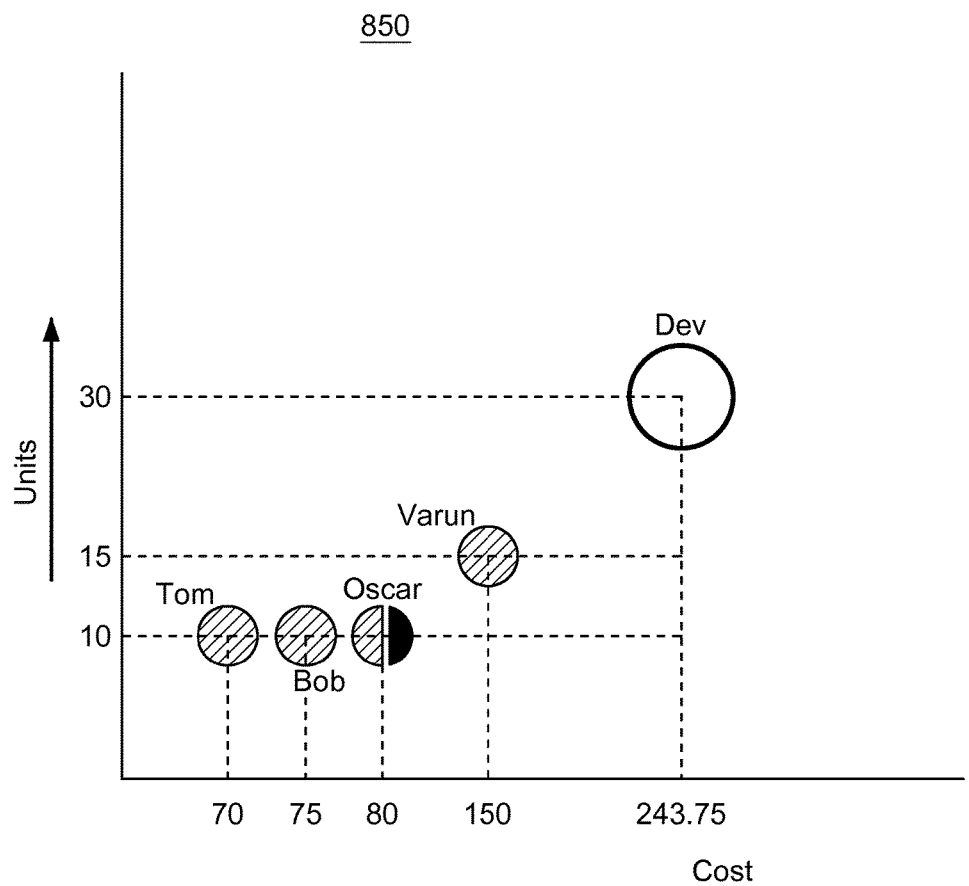
FIG. 8B illustrates a resource suggestion graphical user interface for graphically selecting resources to staff a role, in accordance with one embodiment.

FIG. 8B illustrates a resource suggestion graphical user interface 850 for graphically selecting resources to staff a role, in accordance with one embodiment. Resource suggestion graphical user interface 850 can include a graph of available resources with cost along the x-axis and availability along the y-axis. The graph can also include the role graphed along the x-axis according to the budget remaining and along the y-axis according to the required hours left to staff for the given role.

Each resource can be graphed according to their respective availability and cost and the role can be graphed along the x-axis according to the budget remaining and along the y-axis according to the required hours left to staff for the given role. The budget remaining for the role can be calculated based on the current Total Average Cost of the role minus the cost of any resources already staffed to the role. The availability of each resource can be indicated graphically using, for example, a pie chart for each resource comprising a first colored pie slice (e.g., green) and a second colored pie slice (e.g., red). For example, FIG. 8B shows that resource Oscar's capacity is 10 hours at a cost of $80 in the given duration. However, Oscar is only available 50% which is indicated by equal sized pie slices (the left slice being colored, for example, green and the right slice being colored, for example, red), and hence Oscar can work for 5 hours at a cost of $40 in the given duration.

Figure 9A:
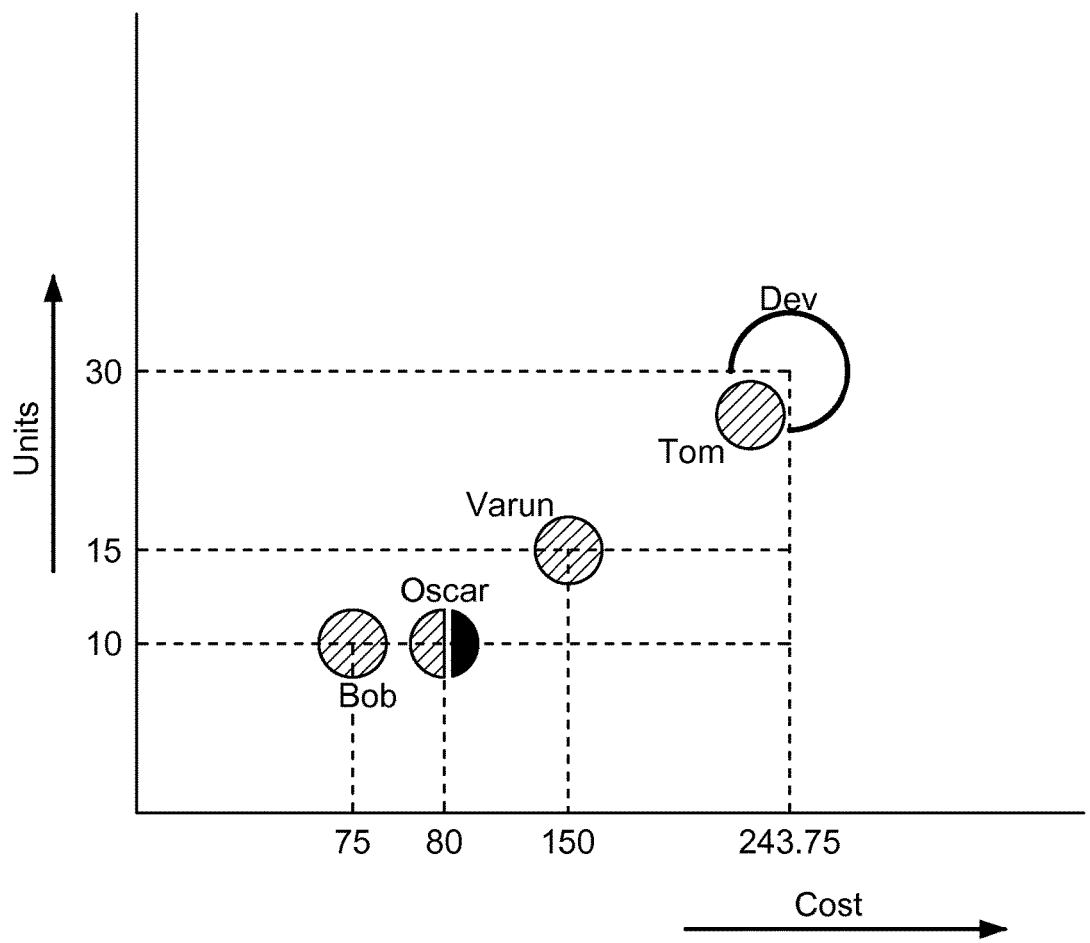
FIG. 9A illustrates a graphical selection of resource Tom for the Dev role, in accordance with one embodiment.

FIG. 9A illustrates graphical selection of resource Tom for the Dev role, in accordance with one embodiment. To select a resource, the user (e.g., the project/resource manager) can drag and drop one or more resources onto the role shown in the graph to staff the role. For example, the user can drag resource Tom to the Dev role, as shown in FIG. 9A, to select resource Tom to be staffed for the Dev role.

Figure 9B:
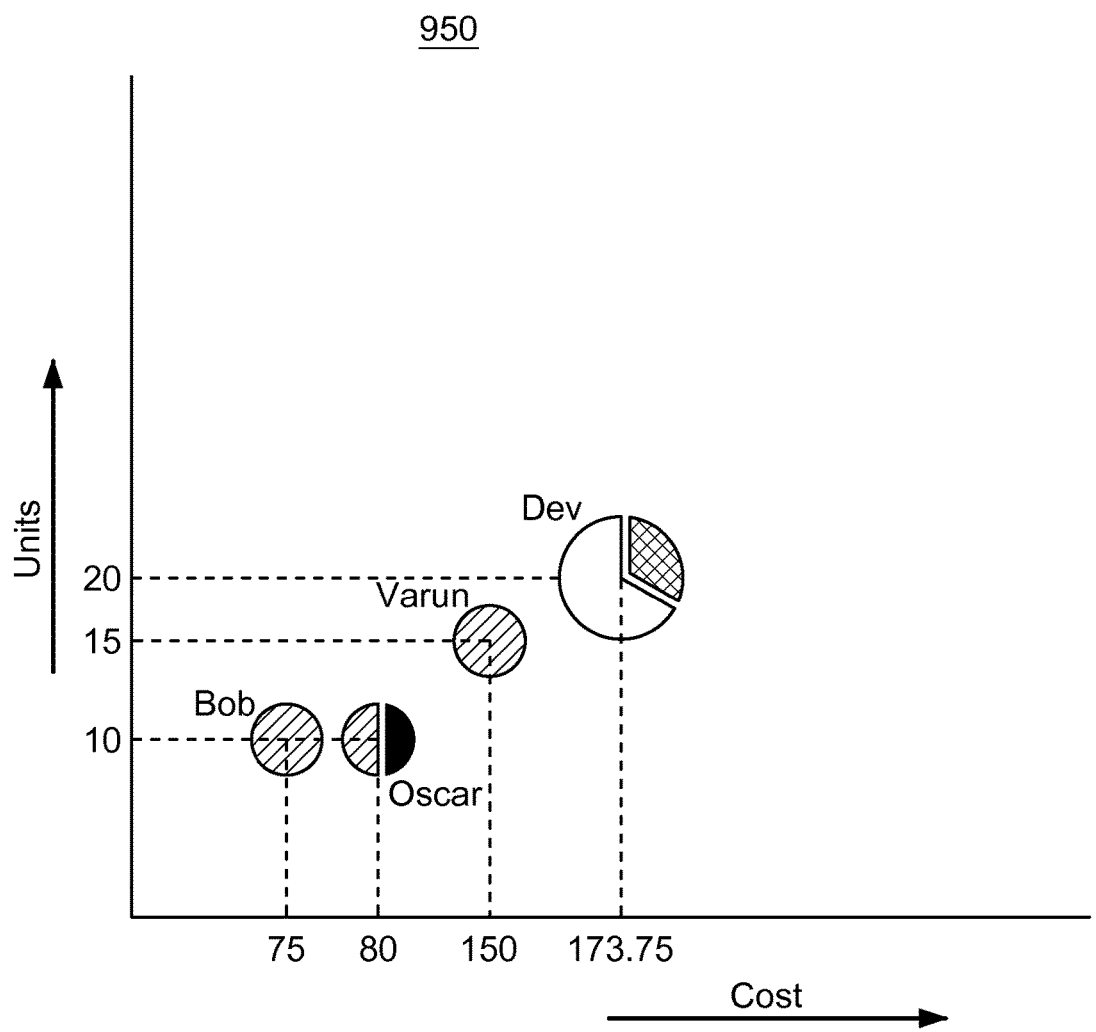
FIG. 9B illustrates an updated resource suggestion graphical user interface 950 indicating a partially staffed Dev role, in accordance with one embodiment.

FIG. 9B illustrates an updated resource suggestion graphical user interface 950 indicating a partially staffed Dev role, in accordance with one embodiment. Once the role is partially staffed, the role gets realigned in the graph (based on cost and units) in the form of pie chart indicating the extent to which it has been staffed as shown in FIG. 9B at the role level. For example, the role pie chart in interface 950 can be updated to include a pie slice corresponding to each selected resource. The role pie chart is also realigned in the graph according the remaining budget and duration left to staff (the remaining budget can be based on Total Average Cost and Average Resource Cost which are both recalculated after resource selection because the pool of available resources has changed). The project level graphical representation shown in FIG. 3 can also be updated to reflect the partial staffing of the role, as shown in FIG. 10A.

Referring again to FIG. 9B, although not shown, a resource that has been selected for staffing can be de-selected by dragging the resource's respective pie slice out of the role pie chart. For example, to remove resource Tom after he was selected as shown in FIGS. 9A and 9B, the user could de-select (or de-staff) Tom by dragging Tom's pie slice in the role pie chart out of the role pie chart. In such an example, when resource Tom's pie slice is dragged out of the role pie graph, resource Tom will be de-selected for the Dev role and the graph can be adjusted to reflect that resource Tom is now available again, as shown, for example, in FIG. 8B.

Figure 10A:
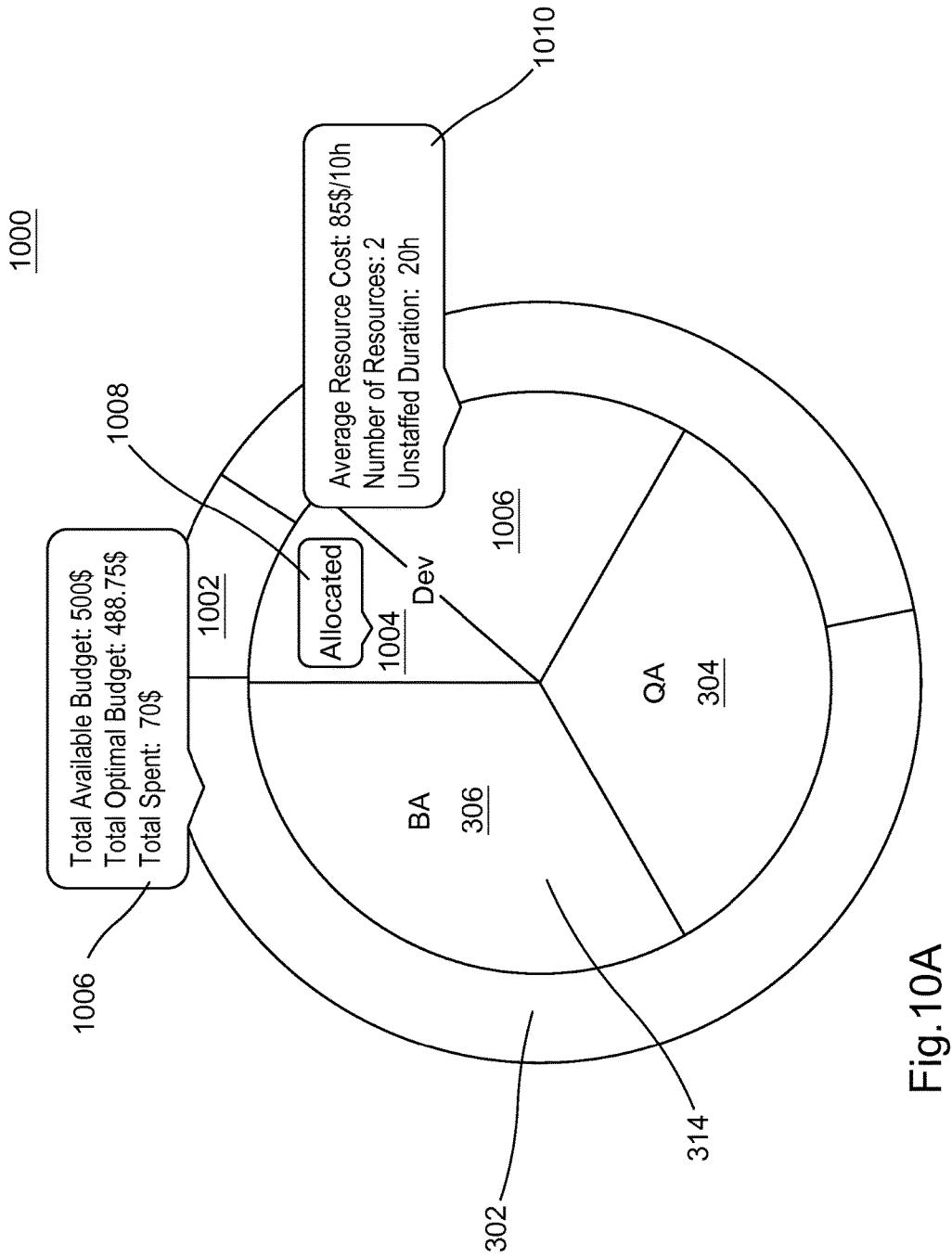
FIG. 10A illustrates a graphical user interface for project level resource staffing reflecting partial staffing of a role, in accordance with one embodiment.

FIG. 10A illustrates a graphical user interface 1000 for project level resource staffing reflecting partial staffing of a role, in accordance with one embodiment. After partially staffing a role, the average resource cost is dynamically recalculated, as discussed above. For example, after staffing the role Dev with resource Tom (as shown, for example, in FIGS. 9A and 9B) the average resource cost increases, as the resource Tom was hired at a lower price than the earlier average resource cost which was $81.25 as shown in FIG. 3. Although not shown, the project/resource manager can then select resource Varun at a higher price $150 for 15 hours of work. After this staffing the average cost available is reduced to $77.50 to staff the rest of the role requirements. The project/resource manager can then choose to staff Oscar for 5 hours (also not shown) as he is available only for 50% of the duration at a price of $40. Hence, in this example, the Dev role is completely staffed with Tom, Varun, and Oscar, and the project level graphical user interface can be updated to reflect the compete staffing of the Dev role as shown in FIG. 10B.

Figure 10B:
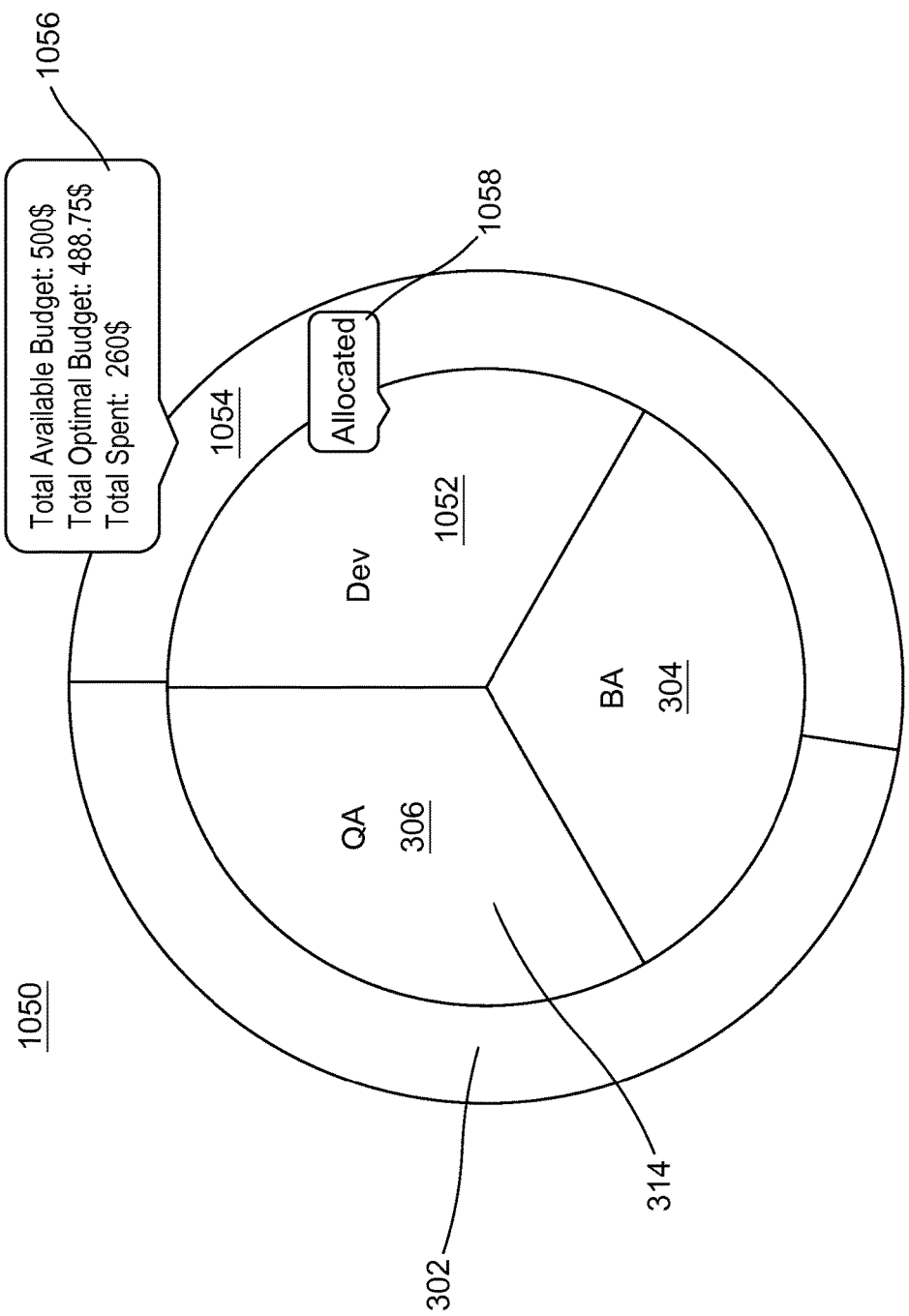
FIG. 10B illustrates a graphical user interface for project level resource staffing indicating complete staffing of a role, in accordance with one embodiment.

FIG. 10B illustrates a graphical user interface 1050 for project level resource staffing indicating complete staffing of a role, in accordance with one embodiment. Graphical user interface 1050 indicates the complete staffing of the Dev role by setting the color of the Dev role pie slice 1052 of the pie chart 314 to a different color than the color of slice 308 shown in FIG. 3 to indicate that the Dev role is now completely staffed. The color indicating complete staffing of the role can be the same or a different color than the color used to indicate partial staffing of the role, as used and described above in FIG. 10A. Graphical user interface 1050 can also indicate the amount of the total budget allocated by the staffing of the role by updating donut graph 302 to increase the allocated portion 1054 corresponding to the budget that has been allocated based on the user's current resource selections. Graphical user interface 1050 can include message 1056 indicating that the project/resource manager has spent a total of $260 to staff the Dev role, as indicated by portion 1054 of donut graph 302 (i.e., the outer circle). However, FIG. 5 shows that, based on the optimal cost calculation, the project/resource manager should have spent $243.75 to staff the role Dev based on the average cost of the available resources. Hence, in this example, the project/resource manager is left with $240 to staff the remaining role requirements after staffing the Dev role as described above.

Figure 11:
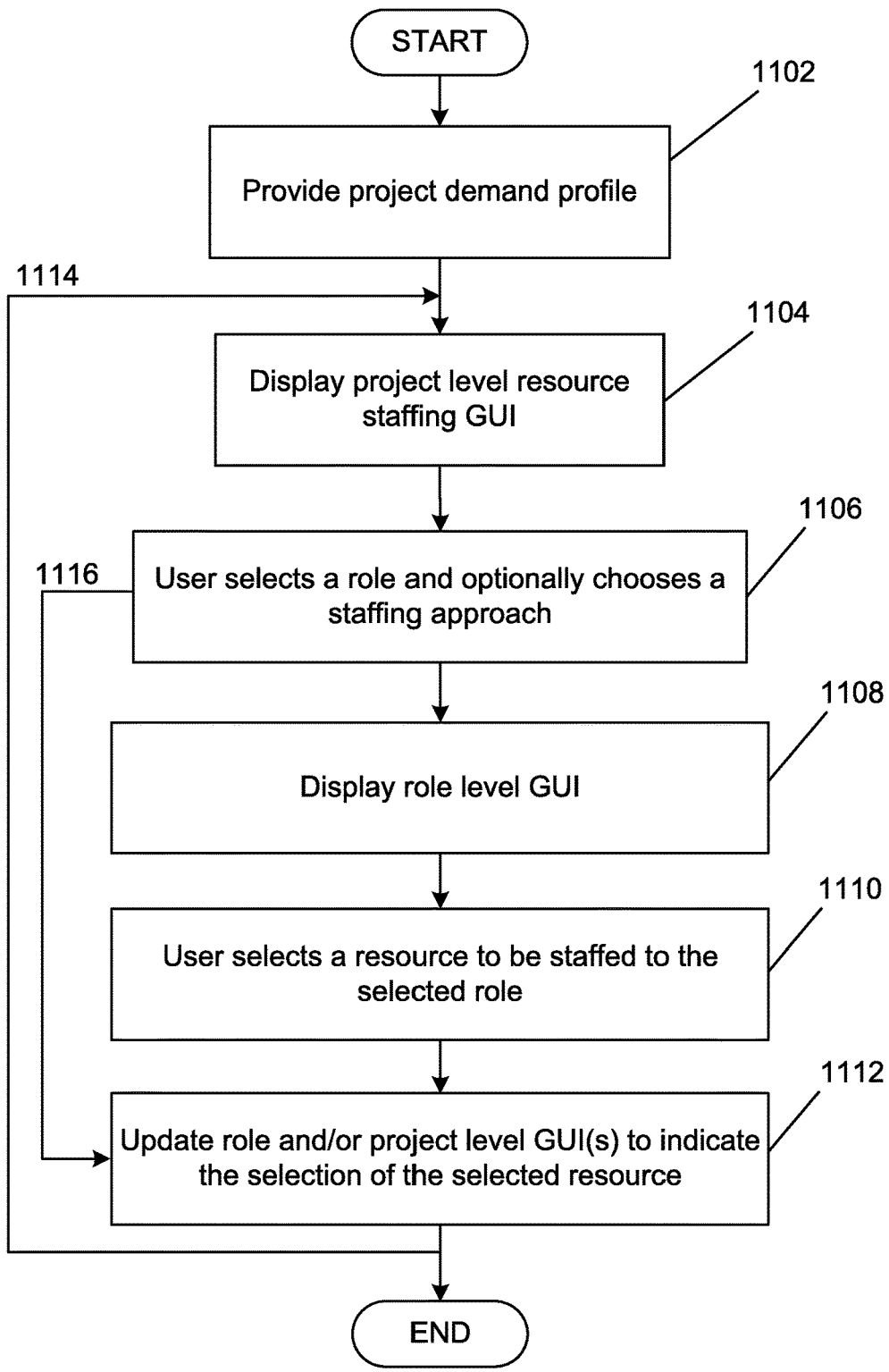
FIG. 11 is a flow diagram showing the functionality for managing a resource staffing graphical user interface in accordance with one embodiment.

FIG. 11 is a flow diagram showing the functionality for managing a resource staffing graphical user interface in accordance with one embodiment. In one embodiment, the functionality of the flow diagram of FIG. 11 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1102, a resource demand profile is provided that specifies the requirements for one or more roles to be staffed for a project team. The resource demand profile can also specify the allocated budget for staffing the project team.

At 1104, module 18 displays a project level resource staffing graphical user interface based on the resource demand profile, such as, for example, graphical user interfaces 300, 700, 1000, and 1050 of FIGS. 3, 7, 10A, and 10B, respectively. The project level resource staffing graphical user interface can include a pie chart and a donut chart; the pie chart including a slice for each role and the donut chart indicating the amount of the allocated budget remaining.

At 1106, a user can select a role to be staffed. In some embodiments, the user can select the role by selecting the slice of the pie chart corresponding to that role, as described above. In some embodiments, the user can choose whether to perform Best Solution Staffing and/or Graphical Staffing. For example, a user can choose the Best Solution Staffing option and continue to Graphical Staffing if the user does not wish to accept the suggested best solution, as described above. In some embodiments, the user is not provided a choice between Best Solution Staffing and/or Graphical Staffing and instead the user automatically processed to either Best Solution Staffing and/or Graphical Staffing.

At 1108, module 18 displays a role level graphical user interface for selecting available resources to be staffed to the selected role. The role level graphical user interface can be a priority based resource selection interface such as graphical user interface 800 shown in FIG. 8A or a resource suggestion interface such as graphical user interfaces 850, 900, and 950 shown in FIGS. 8B, 9A, and 9B, respectively. In some embodiments, the priority based resource selection interface can include a graph of the available resources with quadrants to provide a graphical indication of whether one of the available resources is preferred over another of the available resources based on their respective quadrants.

In some embodiments, the resource suggestion interface can include a graph of available resources for the selected role and the selected role graphed by cost and duration (the duration of the selected role being the unstaffed portion of the total duration of the selected role). In some embodiments, each available resource in the graph can be displayed as a resource pie chart, the resource pie chart having slices to indicate the respective resource's availability, as shown, for example, in FIGS. 8B, 9A, and 9B. In some embodiments, the graphed role can be displayed as a role pie chart having slices to indicate the extent to which the corresponding role has been staffed, as shown, for example, in FIGS. 8B, 9A, and 9B.

At 1110, the user selects a resource to be staffed to the selected role. In some embodiments, the user can select a resource to be staffed by dragging and dropping the resource onto the role in the role level graphical user interface such as, for example, dragging and dropping a resource pie chart onto the role pie chart, as shown, for example, in FIG. 9A.

At 1112, module 18 updates, upon user selection of the resource to be staffed to the selected role, the project level graphical user interface and/or the role level graphical user interfaces. Updating the project level graphical user interface can include updating the slice of the pie chart corresponding to the selected roles to graphically indicate that the selected resource has been selected to be staffed to the one of the one or more roles, as shown, for example, in FIGS. 7, 10A, and 10B. Updating the project level graphical user interface can also include updating the donut chart to indicate the amount of the allocated budget remaining based on the selection of the resource, as shown, for example, in FIGS. 7, 10A, and 10B. Updating the project level graphical user interface can also include updating the pie chart to display a portion of the slice corresponding to the selected role in a different color or shading to graphically indicate the proportion of the selected role's total duration that has been staffed, as shown, for example, in FIG. 10A.

Updating the role level graphical user interface can include updating the role pie chart to indicate the staffing of the selected resource and removing the selected resource pie chart from the graph, as shown, in FIGS. 9A and 9B. Updating the role level graphical user interface can also include moving the location of the role pie chart to correspond to the remaining budget and duration, as shown, for examine, in FIGS. 9A and 9B.

In some embodiments, the functionality of the flow diagram of FIG. 11 can be repeated in whole or in part, an example of which is shown as 1114.

In some embodiments, the functionality of the flow diagram of FIG. 11 can proceed from 1106 to 1112, which is shown as 1116. For example, in such embodiments, when the user, at 1106, selects the Best Solution Staffing option, module 18 can update the project level graphical user interface based on the suggested best solution, as described above.

In some embodiments, the system also provides the project/resource manager the ability to re-staff a role requirement by adding or removing resources through the graphical staffing approach described above. The system behavior for re-staffing is similar to staffing as discussed earlier. For example, the system can provide a graphical user interface for re-staffing that initially indicates the current staffing of each role in a pie chart and the current amount of the budget allocated by the current staffing in a donut chart surrounding the pie chart, similar to the partially staffed display of graphical user interface 1000 of FIG. 10A described above, and the user can select a role to adjust the resource staffing of the project as shown in FIGS. 8A, 8B, 9A, and 9B and described above.

Embodiments provide a novel approach of staffing a project team based on resource demand profile requirements using Best Solution Staffing and/or Graphical Staffing. Such embodiments can include a graphical user interface for graphical resource selection that optimizes the process of selecting resources to staff a project based on resource demand profile requirements.

As disclosed, embodiments comprise a system that generates suggested project team staffing and/or a graphical user interface for graphical resource selection to staff a project team based on a resource demand profile.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage resource staffing, the managing comprising:

providing a resource demand profile comprising requirements for one or more roles to be staffed for a project team and an allocated budget for staffing the project team, wherein the allocated budget is predetermined;

displaying a project level graphical user interface based on the resource demand profile, the project level graphical user interface comprising a pie chart and a donut chart; wherein the pie chart displays a portion corresponding to each of the one or more roles and the donut chart indicates an amount of the allocated budget remaining for each of the one or more roles, wherein the pie and donut charts are displayed simultaneously with the pie chart displayed within the donut chart;

updating, upon selection of a resource to be staffed to one of the one or more roles, the portion of the pie chart corresponding to the one of the one or more roles to graphically indicate that the selected resource has been selected to be staffed to the one of the one or more roles;

updating, upon selection of the resource to be staffed to the one of the one or more roles, the donut chart to indicate an amount of the allocated budget remaining based on the selection of the resource;

displaying, upon user selection of a portion of the pie chart, a resource suggestion interface comprising a graph of available resources for a role corresponding to the selected portion of the pie chart, the graph comprising the available resources and a selected role graphed by cost and duration, the duration of the selected role being an unstaffed portion of the duration of the selected role, wherein the role is displayed as a role pie chart, the role pie chart comprising slices to indicate an extent to which the corresponding role has been staffed, and wherein, upon user dragging and dropping of a selected resource pie chart onto the role pie chart, the graph is updated including:

updating the role pie chart to indicate the staffing of the selected resource; removing the selected resource pie chart from the graph;

and relocating the role pie chart to correspond to the remaining budget and duration.

2. The non-transitory computer readable medium of claim 1, the managing further comprising:

displaying, upon user selection of a portion of the pie chart, a priority based resource selection interface comprising a graph of available resources for the role corresponding to the selected portion of the pie chart, the graph including a plurality of portions to provide a graphical indication of whether one of the available resources is preferred over another of the available resources based on their respective quadrants.

3. The non-transitory computer readable medium of claim 1, wherein each available resource in the graph is displayed as a resource pie chart, the resource pie chart comprising slices to indicate the respective resource's availability.

4. The non-transitory computer readable medium of claim 1, wherein updating the portion of the pie chart corresponding to the one of the one or more roles to graphically indicate that the selected resource has been selected to be staffed to the one of the one or more roles includes updating the pie chart to display the portion in a different color or shading, a size of the portion graphically indicating a proportion of the corresponding role's duration that has been staffed.

5. The non-transitory computer readable medium of claim 1, the managing further comprising:

recommending a best staffing solution comprising a lowest cost combination of resources to staff one of the one or more roles, wherein the selection of the resource to be staffed to the one of the one or more roles is performed automatically and includes selection of one or more resources of the lowest cost combination of resources.

6. The non-transitory computer readable medium of claim 1, wherein the selection of the resource to be staffed to the one of the one or more roles is a user selection.

7. The non-transitory computer readable medium of claim 1, wherein the project level resource staffing graphical user interface is arranged such that the donut chart is around the pie chart.

8. A computer-implemented method for managing resource staffing, the computer-implemented method comprising:

providing a resource demand profile comprising requirements for one or more roles to be staffed for a project team and an allocated budget for staffing the project team, wherein the allocated budget is predetermined;

displaying a project level graphical user interface based on the resource demand profile, the project level graphical user interface comprising a pie chart and a donut chart; wherein the pie chart displays a portion corresponding to each of the one or more roles and the donut chart indicates an amount of the allocated budget remaining for each of the one or more roles, wherein the pie and donut charts are displayed simultaneously with the pie chart displayed within updating, upon selection of a resource to be staffed to one of the one or more roles, the portion of the pie chart corresponding to the one of the one or more roles to graphically indicate that the selected resource has been selected to be staffed to the one of the one or more roles;

updating, upon selection of the resource to be staffed to the one of the one or more roles, the donut chart to indicate an amount of the allocated budget remaining based on the selection of the resource; and displaying, upon user selection of a portion of the pie chart, a priority based resource selection interface and a resource suggestion interface;

the priority based resource selection interface comprising a pie graph of available resources for a role corresponding to the selected portion of the pie chart, the pie graph including a plurality of portions to provide a graphical indication of whether one of the available resources is preferred over another of the available resources based on their respective quadrants; and the resource suggestion interface comprising a donut graph of available resources for the role corresponding to the selected portion of the pie chart, the donut graph comprising the available resources and a selected role graphed by cost and duration, the duration of the selected role being an unstaffed portion of the duration of the selected role, wherein the selected role in the donut graph is displayed as a role pie chart, the role pie chart comprising slices to indicate an extent to which the corresponding role has been staffed, and wherein, upon user dragging and dropping of a selected resource pie chart onto the role pie chart, the donut graph is updated including:

updating the role pie chart to indicate the staffing of the selected resource; removing the selected resource pie chart from the graph; and relocating the role pie chart to correspond to the remaining budget and duration.

9. The computer-implemented method of claim 8, the computer-implemented method further comprising:

recommending a best staffing solution comprising a lowest cost combination of resources to staff one of the one or more roles, wherein the selection of the resource to be staffed to the one of the one or more roles is performed automatically and includes selection of one or more resources of the lowest cost combination of resources.

10. The computer-implemented method of claim 8, wherein the selection of the resource to be staffed to the one of the one or more roles is a user selection.

11. The computer-implemented method of claim 8, wherein the project level resource staffing graphical user interface is arranged such that the donut chart is around the pie chart.

12. A system comprising:

a memory device configured to store a resource staffing module; a processing device in communication with the memory device, the processing device configured to execute the resource staffing module stored in the memory device to manage resource staffing, the managing comprising:

providing a resource demand profile comprising requirements for one or more roles to be staffed for a project team and an allocated budget for staffing the project team, wherein the allocated budget is predetermined;

displaying a project level graphical user interface based on the resource demand profile, the project level graphical user interface comprising a pie chart and a donut chart; wherein the pie chart displays a portion corresponding to each of the one or more roles and the donut chart indicates an amount of the allocated budget remaining for each of the one or more roles, wherein the pie and donut charts are displayed simultaneously with the pie chart displayed within the donut chart;

updating, upon selection of a resource to be staffed to one of the one or more roles, the portion of the pie chart corresponding to the one of the one or more roles to graphically indicate that the selected resource has been selected to be staffed to the one of the one or more roles;

updating, upon selection of the resource to be staffed to the one of the one or more roles, the donut chart to indicate an amount of the allocated budget remaining based on the selection of the resource; and displaying, upon user selection of a portion of the pie chart, a priority based resource selection interface and a resource suggestion interface;

the priority based resource selection interface comprising a pie graph of available resources for a role corresponding to the selected portion of the pie chart, the pie graph including a plurality of portions to provide a graphical indication of whether one of the available resources is preferred over another of the available resources based on their respective quadrants; and the resource suggestion interface comprising a donut graph of available resources for the role corresponding to the selected portion of the pie chart, the donut graph comprising the available resources and a selected role graphed by cost and duration, the duration of the selected role being an unstaffed portion of the duration of the selected role, wherein the selected role in the donut graph is displayed as a role pie chart, the role pie chart comprising slices to indicate an extent to which the corresponding role has been staffed, and wherein, upon user dragging and dropping of a selected resource pie chart onto the role pie chart, the donut graph is updated including:

updating the role pie chart to indicate the staffing of the selected resource;

removing the selected resource pie chart from the graph; and relocating the role pie chart to correspond to the remaining budget and duration.

13. The system of claim 12, the managing further comprising:

recommending a best staffing solution comprising a lowest cost combination of resources to staff one of the one or more roles, wherein the selection of the resource to be staffed to the one of the one or more roles is performed automatically and includes selection of one or more resources of the lowest cost combination of resources.

14. The system of claim 12, wherein the selection of the resource to be staffed to the one of the one or more roles is a user selection.

15. The computer-implemented method of claim 8, wherein updating the portion of the pie chart corresponding to the one of the one or more roles to graphically indicate that the selected resource has been selected to be staffed to the one of the one or more roles includes updating the pie chart to display the portion in a different color or shading, a size of the portion graphically indicating a proportion of the corresponding role's duration that has been staffed.

16. The system of claim 12, wherein updating the portion of the pie chart corresponding to the one of the one or more roles to graphically indicate that the selected resource has been selected to be staffed to the one of the one or more roles includes updating the pie chart to display the portion in a different color or shading, a size of the portion graphically indicating a proportion of the corresponding role's duration that has been staffed.

* * * * *